United States Patent
Li et al.

(10) Patent No.: US 10,308,866 B2
(45) Date of Patent: Jun. 4, 2019

(54) SYNERGISTIC EFFECT OF COSURFACTANTS ON THE RHEOLOGICAL PERFORMANCE OF DRILLING, COMPLETION AND FRACTURING FLUIDS

(71) Applicant: Akzo Nobel Chemicals International B.V., Amersfoort (NL)

(72) Inventors: Lingling Li, Ridgefield, CT (US); James Frederic Gadberry, Danbury, CT (US)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 695 days.

(21) Appl. No.: 14/776,127

(22) PCT Filed: Mar. 12, 2014

(86) PCT No.: PCT/EP2014/054759
§ 371 (c)(1),
(2) Date: Sep. 14, 2015

(87) PCT Pub. No.: WO2014/140055
PCT Pub. Date: Sep. 18, 2014

(65) Prior Publication Data
US 2016/0017210 A1   Jan. 21, 2016

Related U.S. Application Data

(60) Provisional application No. 61/793,695, filed on Mar. 15, 2013, provisional application No. 61/861,092, filed on Aug. 1, 2013.

(51) Int. Cl.
*C09K 8/60* (2006.01)
*C09K 8/62* (2006.01)
(Continued)

(52) U.S. Cl.
CPC .............. *C09K 8/602* (2013.01); *C09K 8/035* (2013.01); *C09K 8/62* (2013.01); *C09K 8/68* (2013.01);
(Continued)

(58) Field of Classification Search
None
See application file for complete search history.

(56) References Cited

U.S. PATENT DOCUMENTS 6,831,108 B2 * 12/2004 Dahanayake ............ A61K 8/02
516/69
7,148,185 B2   12/2006 Fu et al.
(Continued)

FOREIGN PATENT DOCUMENTS

WO      2012/160008 A1    11/2012

OTHER PUBLICATIONS

International Search Report and Written Opinion for PCT/EP2014/054759, dated May 27, 2014.
(Continued)

*Primary Examiner* — John J Figueroa
(74) *Attorney, Agent, or Firm* — Matthew J. DeRuyter

(57) ABSTRACT

The invention relates to the viscoelastic surfactant based fluids and methods for utilizing same in oilfield applications including, but not limited to gravel packing, cleanup, drilling, acidizing, fracturing and the like in a subterranean formation. The viscoelastic fluid of the invention comprises at least one amphoteric surfactant and at least one synergistic cosurfactant that increases the gel strength and extends the brine tolerance of said viscoelastic-based fluid.

15 Claims, 11 Drawing Sheets

(51) Int. Cl.
*C09K 8/035* (2006.01)
*E21B 43/26* (2006.01)
*C09K 8/68* (2006.01)
*C09K 8/74* (2006.01)

(52) U.S. Cl.
CPC ............... *C09K 8/74* (2013.01); *E21B 43/26* (2013.01); *C09K 2208/30* (2013.01)

(56) References Cited

U.S. PATENT DOCUMENTS

| | | | |
|---|---|---|---|
| 7,461,694 B2 * | 12/2008 | Dahanayake | C09K 8/584 |
| | | | 166/270.1 |
| 7,897,547 B1 | 3/2011 | Lin et al. | |
| 2002/0033260 A1 | 3/2002 | Lungwitz et al. | |
| 2006/0084579 A1 | 4/2006 | Berger et al. | |
| 2008/0011475 A1 * | 1/2008 | Berger | C09K 8/584 |
| | | | 166/270.1 |
| 2008/0176773 A1 * | 7/2008 | Wheeler | C09K 8/68 |
| | | | 507/266 |
| 2008/0277112 A1 | 11/2008 | Welton et al. | |
| 2009/0111716 A1 * | 4/2009 | Hough | C09K 8/584 |
| | | | 507/214 |
| 2009/0291864 A1 * | 11/2009 | Hartshorne | B01F 17/0057 |
| | | | 507/244 |
| 2012/0024529 A1 | 2/2012 | Van Zanten et al. | |
| 2012/0285694 A1 | 11/2012 | Morvan et al. | |

OTHER PUBLICATIONS

K.F. Paus, Drilling Fluids, Moscow, "Nedra," 1973, pp. 16-18.
English translation of the Office Action issued in counterpart Russian Application No. 2015142821 dated Sep. 4, 2018, 4 pages.

* cited by examiner

Shear rate recovery after  30min        80min        120min  (RT)

after  30min        90min        120min  (180F)

after 30min     80min     120min    (RT)

after 30min     80min     120min

SYNERGISTIC EFFECT OF COSURFACTANTS ON THE RHEOLOGICAL PERFORMANCE OF DRILLING, COMPLETION AND FRACTURING FLUIDS

CROSS-REFERENCE TO RELATED APPLICATIONS

This application is a national stage filing under 35 U.S.C. § 371 of PCT/EP2014/054759, filed Mar. 12, 2014, which claims priority to U.S. Provisional Patent Application Nos. 61/793,695 filed Mar. 15, 2013 and 61/861,092, filed Aug. 1, 2013, the contents of which are each incorporated herein by reference in their entireties.

FIELD OF THE INVENTION

The present invention relates to the drilling, completion and stimulation of hydrocarbon-containing formations. More specifically, the invention relates to the viscoelastic surfactant based fluids and methods for utilizing same in gravel packing, cleanup, drilling and fracturing in a subterranean formation.

BACKGROUND OF THE INVENTION

Viscoelastic fluids play a very important roles in oilfield applications. The viscosity allows the fluids to carry particles from one place to another. For example, the drilling fluid is able to carry the drilling cuts from the wellbore to the surface. Viscous fluids also play an essential role in gravel packing completion. In gravel pack operations, a steel screen is placed in the wellbore and the viscous completion fluid places prepared gravel of a specific size in the surrounding annulus to minimize the sand production. Fracturing fluids are also required to be viscous enough. A hydraulic fracture is formed by pumping the fracturing fluid into the wellbore at a rate sufficient to increase pressure downhole to exceed that of the fracture gradient of the rock. The fracturing fluid contains the proppant, which keeps an induced hydraulic fracture open after the pressure is released. Therefore it is important for the fluid to have enough viscosity to transport the proppant into the fracture.

Polymers have been used to make viscous fluids for decades. However, recently, viscoelastic surfactants (VES) have been widely applied to the oilfield in applications such as drilling, gravel packing, acidizing, and fracturing applications due to their non- or less-damaging characteristics. VES-based fluids have excellent capacity to suspend and transport sand/proppant. VES fluids have several distinctive advantages over polymer-based fluids. Unlike polymer fluids, the VES based fluids are solid free, which minimize the formation damage after they break. However, many viscoelastic surfactants are very sensitive to high concentrated brines. They don't often gel the heavy brines or the fluid viscosity is not stable under high temperature conditions. Therefore, viscoelastic fluids have some limitations for drilling, completion and fracturing applications, especially for deep wells, because many deep wells have bottom hole temperatures of 149° C. (300° F.) or more, and they require heavy fluids to balance the well pressure and maintain control of the well.

In the literature, it has been reported that several VES packages, such as VES/low MW polymer, cationic/anioinic surfactants and VES/cosurfactant can successfully viscosify moderate density brines (like $CaCl_2$, $CaBr_2$ and NaBr brine). However, none of them can work in heavy $ZnBr_2$ brine at temperatures above 250° F. under normal dosage (equal or less than 6 vol % as received). The $ZnBr_2$ brine and the mixed brine made by $ZnBr_2/CaBr_2/CaCl_2$ will be used if a density of 15 ppg or higher is needed for deep wells to balance the well pressure.

U.S. Patent Application Publication No. 2002-0033260 describes a high brine carrier fluid having a density of >1.3 g/cm3 (10.8 ppg) contains a component selected from organic acids, organic acid salts, and inorganic salts; a cosurfactant that may be sodium dodecylbenzene sulfonate (SDBS), sodium dodecylsulfate (SDS) or a mixture of two, or a hydroxyethylaminocarboxylic acid; and a zwitterionic surfactant, preferably a betaine, most preferably an oleyl betaine. It is indicated that zinc halides are not preferred, especially zinc bromide. In the examples, the heaviest brine that a useful viscosity was maintained in was at a density of 1.64 g/cm3 (13.7 ppg). The highest working temperature is 138° C. (280° F.).

U.S. Pat. No. 7,148,185 B2 describes the surfactant fluid gels that are stable to brines having densities above about 1.56 g/cm3 (13 ppg) at high temperatures. The well treatments fluids contain a surfactant, preferably erucylamidopropyl betaine, and an amount of alcohol, preferably methanol, and a salt or mixture of salts of a divalent cation or mixture of divalent cations forming a brine, preferably one or more of bromide and/or chlorides of calcium and/or zinc. Cosurfactants, such as sodium dedecylbeneze sulfonate (SDBS) can also be used. The concentration of surfactant, BET-E-40, shown in the most of examples in heavy brines are 10%.

The VES fluid/fluid system of the present invention addresses the problem that drilling and production engineers have had for years. More particularly, the VES based fluid system of the invention exhibits significantly improved viscosity in high-density brines at elevated temperatures (>300° F.).

SUMMARY OF INVENTION

The present invention generally relates to viscoelastic surfactant based fluids and methods for utilizing same in various oilfield applications including, but not limited to, gravel packing, cleanup, drilling, acidizing and fracturing operations. The viscoelastic fluid of the invention comprises at least one amphoteric surfactant and at least one synergistic co-surfactant that increases the gel strength and extends the brine tolerance of said viscoelastic-based fluid.

DETAILED DESCRIPTION OF THE FIGURES

DETAILED DESCRIPTION OF THE INVENTION

Figure 1:
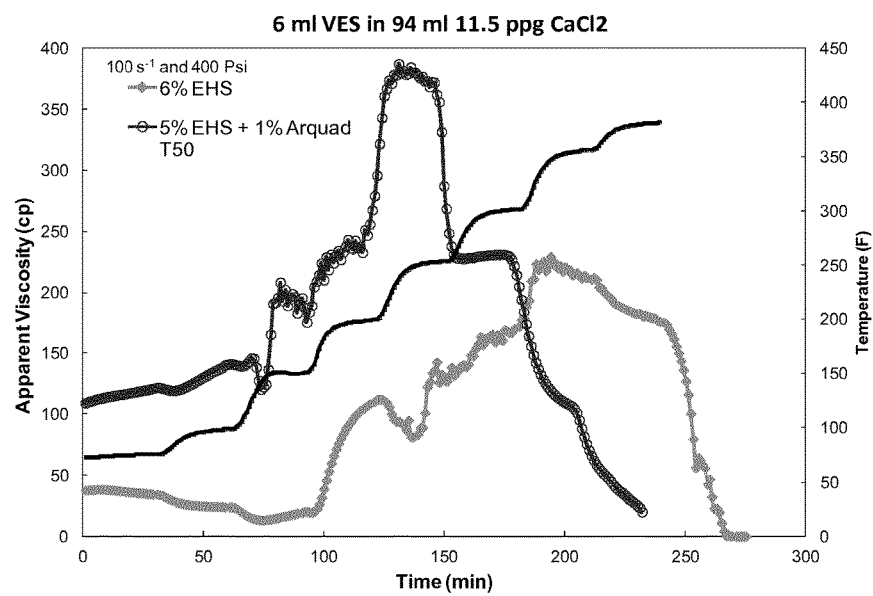
FIG. 1 is a graph of the effect of cosurfactant A on the viscosity of Armovis EHS in 11.5 ppg CaCl2.

The present invention relates to a VES fluid system that exhibits significantly improved viscosity in high-density brines at elevated temperatures (>300° F.). Numerous rheological experiments have been run to show the excellent viscoelasticity in heavy ZnBr$_2$ brine (16.5 ppg) up to 400° F., at a shear rate of 100 s$^{-1}$ and pressure of 400 psi. Sand settling tests have been conducted at ambient temperature and high temperatures to show the excellent sand suspension properties of this new VES system. VES fluid system of the invention also has an extremely low (−15° C.) pour point, which solves the handling and transportation issues in cold regions.

The thickened compositions of the present invention can usefully be employed in methods of stimulating and/or modifying the permeability of underground formations, in drilling fluids, completion fluids, workover fluids, acidizing fluids, gravel packing, fracturing and the like. Additionally, the thickened compositions of the present invention can also be employed in cleaning formulations, water-based coatings, detergent formulations, personal care formulations, water based asphalt formulations and the like.

Viscoelasticity is a desirable rheological feature in drilling fluids, workover or completion fluids, and stimulation fluids which can be provided by fluid modifying agents such as polymeric agents and surfactant gelling agents. Viscoelastic fluids are those which exhibit both elastic behavior and viscous behavior. Elasticity is defined as an instant strain (deformation) response of a material to an applied stress. Once the stress is removed, the material returns to its undeformed equilibrium state. This type of behavior is associated with solids. On the other hand, the viscous behavior is defined as a continuous deformation resulting from an applied stress. After a while, the deformation rate (shear rate or strain rate in general) becomes steady. Once the stress is removed, the material does not return to its initial undeformed state. This type of behavior is associated with liquids. Viscoelastic fluids may behave as a viscous fluid or an elastic solid, or a combination of both depending upon the applied stress on the system and the time scale of the observation. Viscoelastic fluids exhibit an elastic response immediately after the stress is applied. After the initial elastic response, the strain relaxes and the fluid starts to flow in a viscous manner. The elastic behaviour of fluids is believed to aid significantly in the transport of solid particles.

The viscosity of a viscoelastic fluid may also vary with the stress or rate of strain applied. In the case of shear deformations, it is very common that the viscosity of the fluid drops with increasing shear rate or shear stress. This behavior is usually referred to as "shear thinning". Viscoelasticity in fluids that is caused by surfactants can manifest itself shear thinning behavior. For example, when such a fluid is passed through a pump or is in the vicinity of a rotating drill bit, the fluid is in a high shear rate environment and the viscosity is low, resulting in low friction pressures and pumping energy savings. When the shearing stress is abated, the fluid returns to a higher viscosity condition. This is because the viscoelastic behavior is caused by surfactant aggregations in the fluid. These aggregations will adjust to the conditions of the fluid, and will form different aggregate shapes under different shear stresses. Thus, one can have a fluid that behaves as a high viscosity fluid under low shear rates, and a low viscosity fluid under higher shear rates. High low shear-rate viscosities are good for solids transport.

The elastic component of a viscoelastic fluid may also manifest itself in a yield stress value. This allows a viscoelastic fluid to suspend an insoluble material, for example sand or drill cuttings, for a greater time period than a viscous fluid of the same apparent viscosity. Yield stresses that are too high are not a good thing in drilling, as it may make restarting the drilling bit very difficult and causes a condition called "stuck pipe".

Another function of viscoelastic fluids in oil drilling applications is in permeability modification. Secondary recovery of oil from reservoirs involves supplementing by artificial means the natural energy inherent in the reservoir to recover the oil. For example when the oil is stored in a porous rock it is often recovered by driving a pressurized fluid, such as brine, through one or more drill holes (injecting wells) into the reservoir formation to force the oil to a well bore from which it can be recovered. However, rock often has areas of high and low permeability. The brine injected can finger its way through the high permeability areas leaving unrecovered oil in the low permeability areas.

The fluid system of the invention comprises an effective amount of at least one a viscoelastic surfactant and an effective amount of at least one synergistic cosurfactant.

The viscoelastic surfactant is an amphoteric surfactant that has the general formula (I):

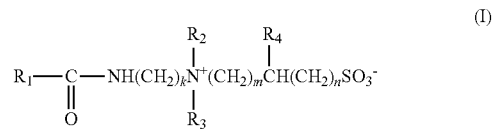

wherein $R_1$ is a saturated or unsaturated, hydrocarbon group of from about 17 to about 29 carbon atoms, in another embodiment from about 18 to about 21 carbon atoms. In another embodiment $R_1$ is a fatty aliphatic derived from natural fats or oils having an iodine value of from about 1 to about 140, in another embodiment from about 30 to about 90, and in still another embodiment from 40 to about 70. $R_1$ may be restricted to a single chain length or may be of mixed chain length such as those groups derived from natural fats and oils or petroleum stocks. Preferred examples include, but are not limited to, tallow alkyl, hardened tallow alkyl, rapeseed alkyl, hardened rapeseed alkyl, tall oil alkyl, hardened tall oil alkyl, coco alkyl, oleyl, erucyl or soya alkyl. $R_2$ and $R_3$ are each independently selected from a straight chain or branched, alkyl or hydroxyalkyl group of from 1 to about 6 carbon atoms, in another embodiment, of 1 to 4 carbon atoms and still another embodiment from 1 to 3 carbon atoms. $R_4$ is selected from H, alkyl or hydroxyalkyl groups of from 1 to about 4 carbon atoms; preferably ethyl, hydroxyethyl, OH or methyl. Of the remaining substituents, k is an integer of from 2-20, in another embodiment 2-12, and in still another embodiment 2-6, and in yet and in still another embodiment 2-4; m is an integer of from 1-20, in another embodiment 1-12, and in still another embodiment 1-6, and in still another embodiment 1-3; and n is an integer of from 0-20, in another embodiment 0-12, and in still another embodiment 0-6, and in still another embodiment 0-1. The concentration of viscoelastic composition in the fluid is generally from about 0.5% to about 10%, in another embodiment from about 2% to about 8%, and in yet another embodiment from about 3% to about 5% by weight.

The viscoelastic surfactants disclosed and described herein are surfactants that can be added singly or they can be used as a primary component in the aqueous, thickened compositions of the present invention. Examples of the viscoelastic surfactants contemplated by the present invention include, but are not limited to, erucamidopropyl hydroxypropyl sulfobetaine, erucamidopropyl hydroxyethyl sulfobetaine, erucamidopropyl hydroxymethyl sulfobetaine, and combinations and mixtures thereof. Armovis EHS, an erucamidopropyl hydroxypropylsultaine, can be beneficially employed and is available from AkzoNobel, Chicago, Ill. Yet another example of the viscoelastic surfactant is the surfactant of Formula (I) where $R_1$ is unsaturated 21 carbon chain, $R_2$ and $R_3$ are methyl group, $R_4$ is hydroxyl group, k equals 3, both m and n are 1.

The synergistic co-surfactant increases the gel strength of the viscoelastic-based fluid and extends the brine tolerance. It has the general structure (II)

wherein $R_1$ is a saturated or unsaturated, hydrocarbon group of from about 12 to about 22 carbon atoms. $R_2$, $R_3$ and $R_4$ are each independently selected from a straight chain or branched, alkyl or hydroxyalkyl group of from 1 to about 4 carbon atoms; and a hydroxyl group. The concentration of the cosurfactant in the fluid is from about 0.1 wt % to about 4%; In another embodiment, the concentration of the cosurfactant in the fluid is about 0.5 wt % to about 1.5 wt %. The ratio of surfactant to synergistic co-surfactant is generally from about 1:1 to about 15:1; in another embodiment from about 2:1 to 15:1; in still another embodiment from 3:1 to about 15:1, and in yet another embodiment from 3:1 to about 10:1. Examples of co-surfactants include, but are not limited to, Arquad T/50 and Ethoquad E/12-75, both of which are available from AkzoNobel, Chicago, Ill. Further examples of co-surfactants include, but are not limited to, a cationic surfactant of Formula (II) where $R_1$ is unsaturated 18 carbon chain, $R_2$, $R_3$ and $R_4$ is hydroxyl groups; and a cationic surfactant of Formula (II) where $R_1$ is unsaturated 22 carbon chain, $R_2$, $R_3$ are ethylhydroxy groups and $R_4$ is methyl group.

High density brines for oilfield use are usually made from salts of divalent cations such as calcium and zinc. Brines made from potassium, ammonium, sodium, cesium and the like may be used as well. Organic cations such as tetramethylammonium can also be employed. Typical inorganic anions for high density brines are chloride and bromide. Organic anions such as formate and acetate may be used. Some combinations of these anions and cations may have to be used to give higher density brines. The selection of one salt over the other or two salts over single salt typically depends on environmental factors. For example, a single salt fluid may work during the heat of the summer, whereas during cooler temperatures a two salt fluid may be required due to its lower Truce Crystallization Temperature (TCT), i.e., the temperature at which crystalline solids begin to form when cooled. The loss of soluble salts, either by settling out or filtration, will drastically reduce the density of treatment fluid. Loss of density can result in a dangerous underbalanced situation.

The invention will be illustrated by the following non-limiting examples. It is clear from the below examples that the viscoelastic fluid/well stimulation fluid according to the present invention has quite a high density. In one embodiment, the viscoelastic fluid/well stimulation fluid according to the present invention has a density of greater than 9.5 ppg; in another embodiment, greater than 9.8 ppg; in yet another embodiment, greater than 11.5 ppg. Further, in one embodiment, the viscoelastic fluid/well stimulation fluid according to the present invention has a density of 19.2 ppg or less; in another embodiment, 16.5 ppg or less. The range of density of the viscoelastic fluid/well stimulation fluid according to the present invention may be greater than 9.5 ppg to 19.2 ppg or less, preferably, greater than 9.8 ppg to 16.5 or less.

The viscoelastic surfactant used in the examples is Armovis EHS, available from AkzoNobel. The co-surfactants used in the examples are cationic cosurfactant A and cationic cosurfactant B. Cosurfactant A is Arquad T/50, a cationic surfactant based on tallow amine (Tallowtrimethylammonium chloride). Cosurfactant B is Ethoquad E/12-75, an erucyl amine (2) ethoxylate, quarternary ammonium salt. Both cosurfactants are available from AkzoNobel.

GENERAL PROCEDURES FOR EXAMPLES 1-7

Brines in various concentrations were made. To a 500 ml stainless steel blender was added a brine solution followed by certain amount (by volume) of Armovis EHS/cosurfactant (40% to 50% by activity). The resulting mixture was stirred for 3 min at an rpm of 3000-4000 in the blender. The resultant gel was then centrifuged at an rpm of 1000 for 15 min to remove the air bubbles. Rheological performance was evaluated using a Grace Instrument Rheometer (model M5600) at constant shear rate, except for Example 5, at different temperatures. A pressure of 400 psi was applied to minimize evaporation of the sample, especially at high temperatures.

Example 1

Shown in FIG. 1 is a graph of the effect of cosurfactant A on the viscosity of Armovis EHS in 11.5 ppg CaCl2. It was observed that the viscosity at low temperatures was significantly increased with the addition of cosurfactant A. The performance at high temperatures was still excellent up to 350 F. The viscosity reading was 132 cp at 350 F at 100 $s^{-1}$. The results are shown in FIG. 1.

Example 2

Figure 2:
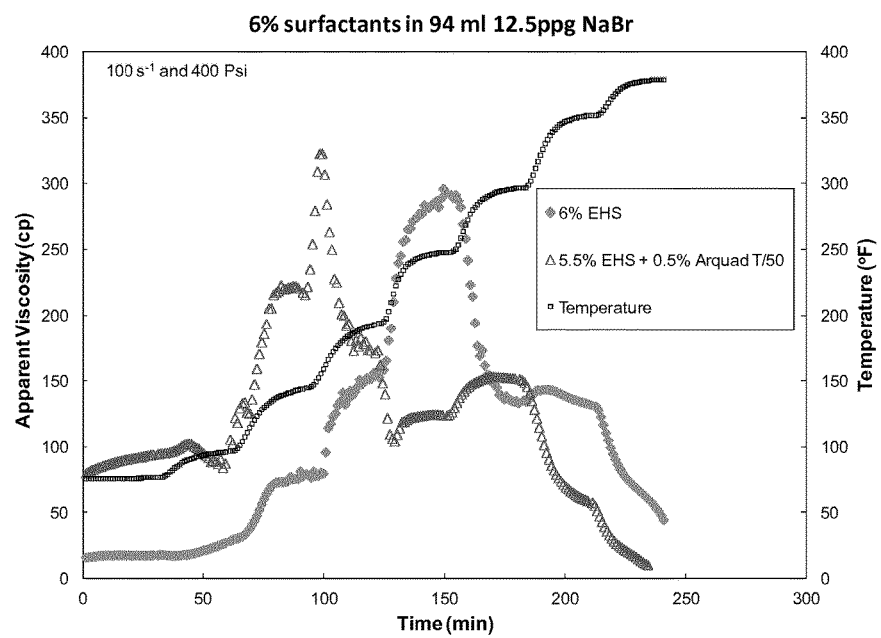
FIG. 2 shows the results of viscosity with and without the addition of cosurfactant A in 12.5 ppg NaBr.

FIG. 2 shows the results of viscosity with and without the addition of cosurfactant A in 12.5 ppg NaBr. The low temperature performance was increased dramatically after the addition of cosurfactant A, and the viscosity maintained the viscosity above 100 cp up to 330° F.

Example 3

Figure 3:
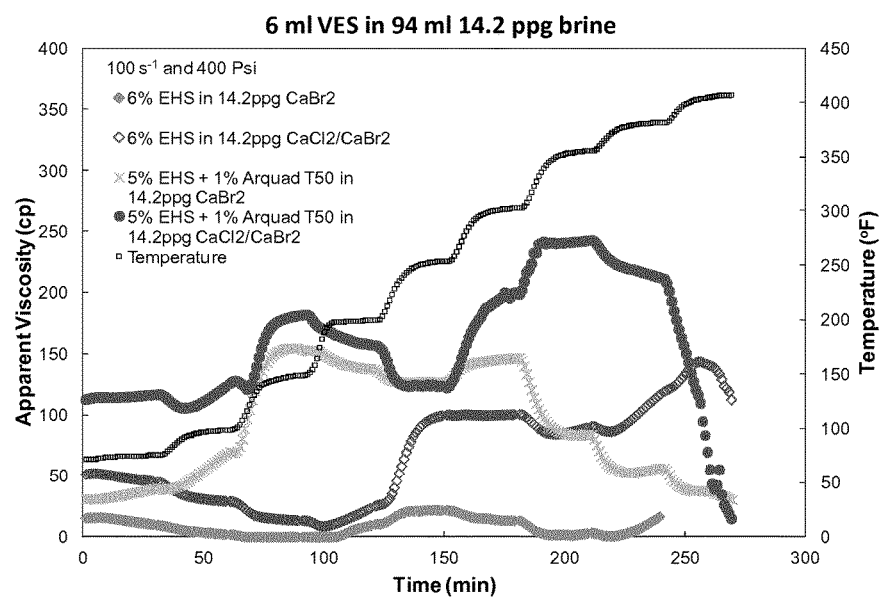
FIG. 3 shows the test results demonstrating the effect of brine type and cosurfactant on the performance of EHS.

Shown in FIG. 3 are the test results showing the effect of brine type and cosurfactant on the performance of EHS. Tests indicate that the viscosity of EHS only in 14.2 ppg CaBr2 was very low at all the examined temperatures, while as, if the brine was replaced by 14.2 ppg mixed CaBr2/CaCl2, the viscosity profile was improved a lot, although it was not good enough. The graph also shows the amazing results after the addition of cosurfactant A. It can be seen that the viscosity was doubled at ambient temperature in both of brines, and the performance profile was boosted significantly.

Examples 4-5

Figure 4:
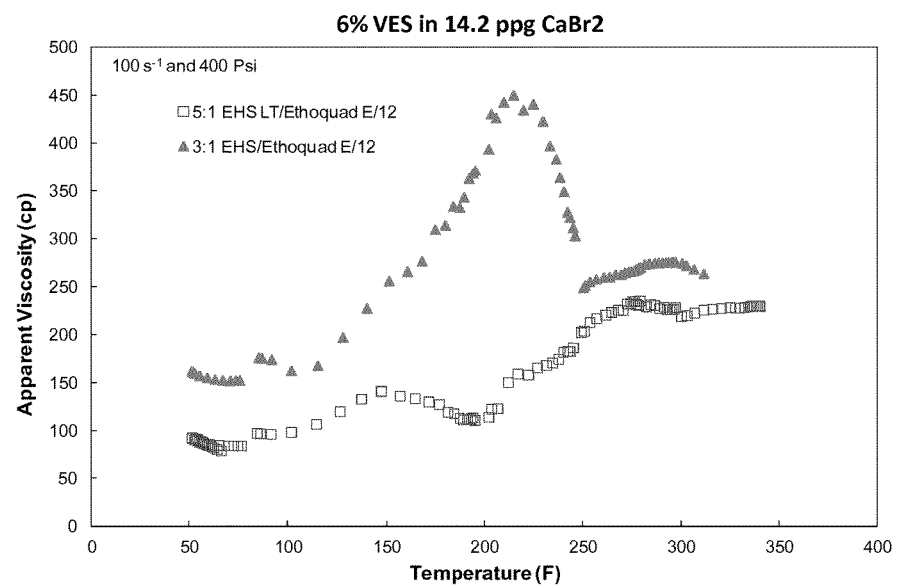
FIG. 4 shows the effect of cosurfactant B in 14.2 ppg CaBr2.

The test result in FIG. 4 shows the effect of cosurfactant B in 14.2 ppg CaBr2. Compared to the performance of EHS alone in 14.2 ppg CaBr2 in FIG. 3, the addition of the cosurfactant B improved the viscosity, at the temperature band of 50-300 F, by at least a factor of 10.

Figure 5:
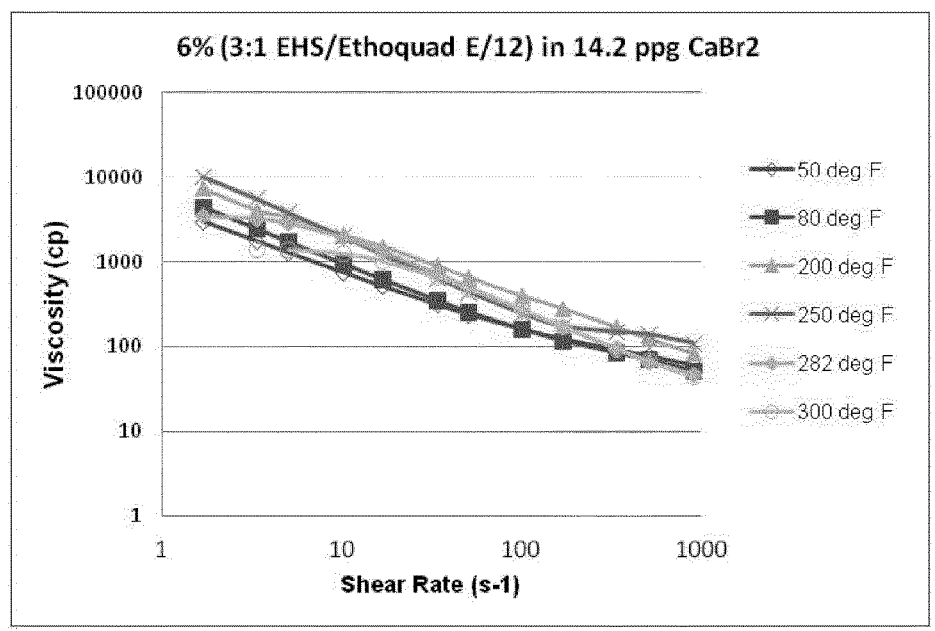
FIG. 5 shows the results of viscosity at various shear rates after the addition of cosurfactant B in 14.2 ppg CaBr2 at different temperatures.

FIG. 5 shows the results of viscosity at various shear rates after the addition of cosurfactant B in 14.2 ppg CaBr2 at different temperatures. Obviously, the surfactant in brine behaved as shear-thinning non-Newtonian fluid. The high viscosity at low shear rate indicates the high elasticity of the fluid, over the temperature band of 50-300 F.

Example 6

Figure 6:
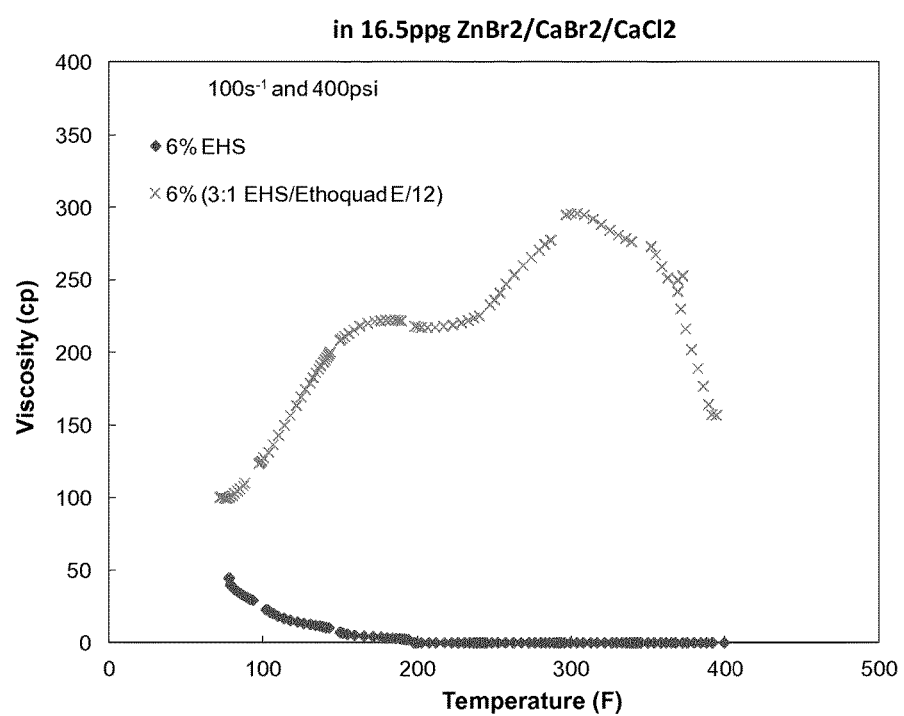
FIG. 6 shows the excellent results of EHS with the cosurfactant B in 16.5 ppg ZnBr2/CaBr2/CaCl2 mixed brine.

For extremely deep wells, ZnBr2 is commonly used for completion, because of its high density. Not many viscoelastic surfactants can work well in ZnBr2 brine, especially in heavy brine with density above 14 ppg. FIG. 6 shows the excellent results of EHS with the cosurfactant B in 16.5 ppg ZnBr2/CaBr2/CaCl2 mixed brine. If Armovis EHS was used alone, almost no gelled effect was noticed. However, after the addition of cosurfactant B, the viscosity went up substantially, from ambient temperature to 400° F.

Example 7

Figure 7:
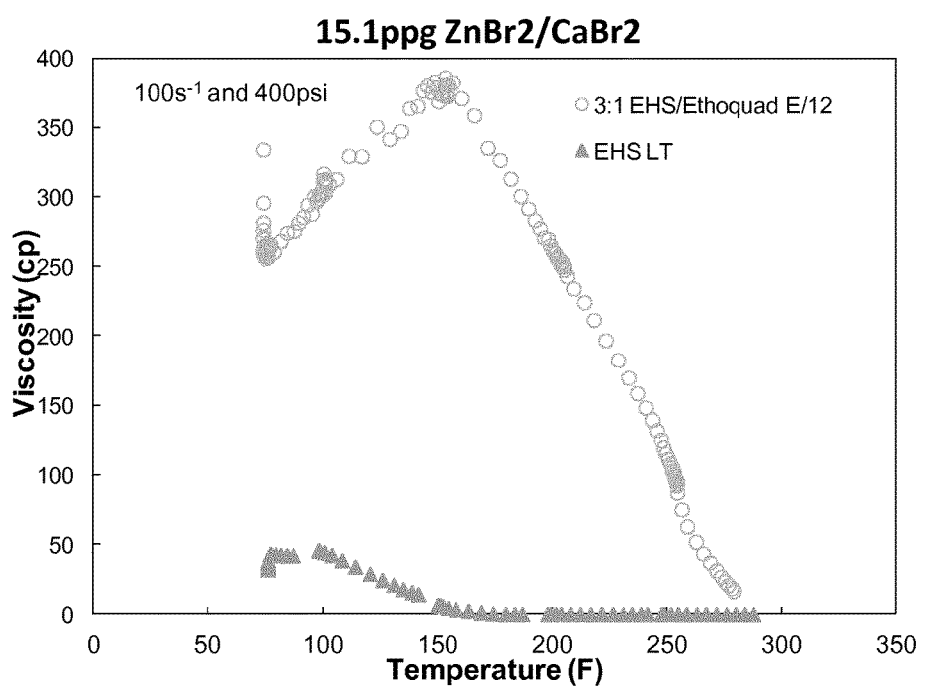
FIG. 7 is a graph showing the comparison between two surfactant systems in 15.1 ppg ZnBr2/CaBr2.

Shown in FIG. 7 is a graph showing the comparison between two surfactant systems in 15.1 ppg ZnBr2/CaBr2. It can be seen that there is huge difference with and without the use of cosurfactant B. The maximum working temperature in this particular brine is 250° F. Apparently, based on the result from FIG. 6, chloride salt plays an important role in extending the temperature upper limit of surfactants. Pour points of EHS with the cosurfactants were also examined. The blend system of EHS and cosurfactant has a pour point as low as −15° C., which makes it applicable in the cold regions.

GENERAL PROCEDURES FOR EXAMPLES 8-9

The surfactants were blended in 20% CaCl2 (about 9.8 ppg) to make the gel, in the same way as described in Examples 1 to 7. Then the gel was put in the refrigerator. The Grace M5600 Rheometer was used for the measurements. The rheometer was pre-cooled from room temperature by using 1:1 ethylene glycol/water as coolant circulator. After the sample was put on the rheometer and the temperature reached 36 F, the sample was rotated at a shear rate of 900 $s^{-1}$ for 2 min. Then the rheometer was stopped and restarted immediately with a lower shear rate (100 $s^{-1}$ for FIG. 8 and 1 $s^{-1}$ for FIG. 9). The changes in viscosity with time were recorded.

Examples 8-9

Figure 8:
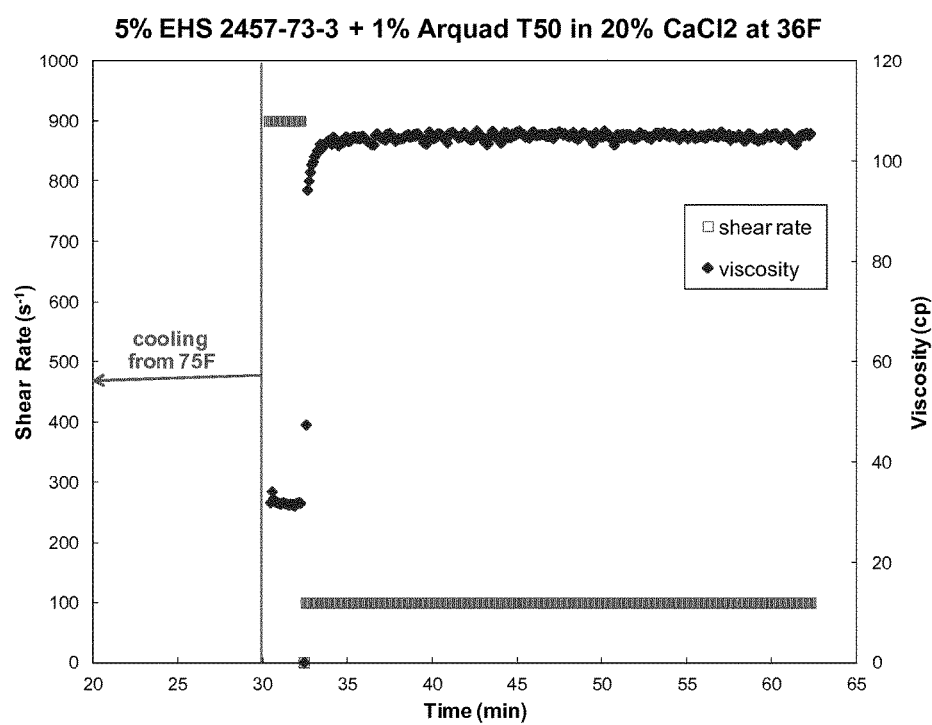
FIGS. 8 and 9 show how long it took EHS/cosurfactant A system for viscosity recovery in 20% CaCl2 at 36° F. (100 s$^{-1}$ for FIG. 8 and 1 s$^{-1}$ for FIG. 9).
Figure 9:
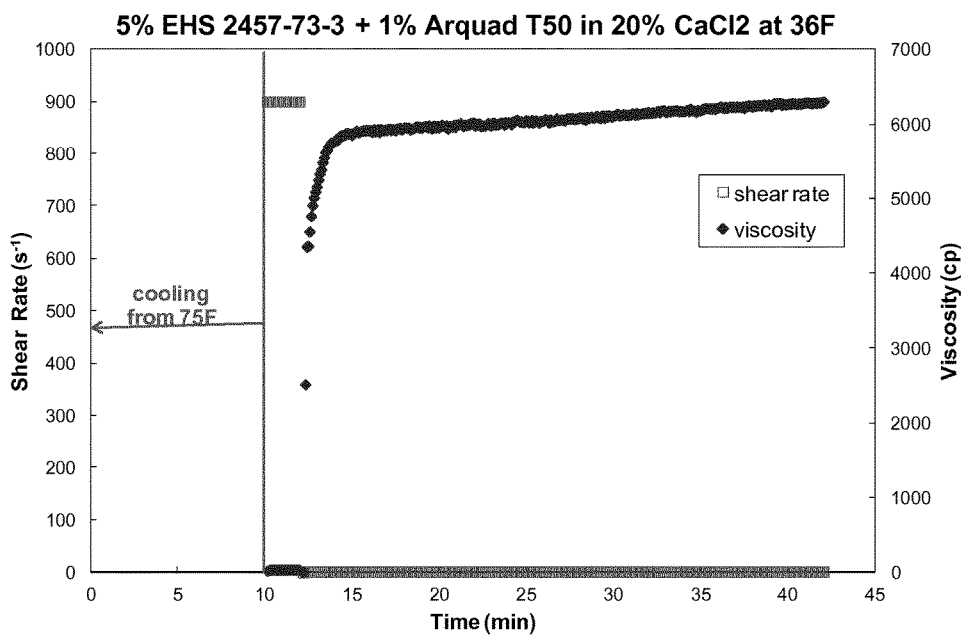
Figure 10:
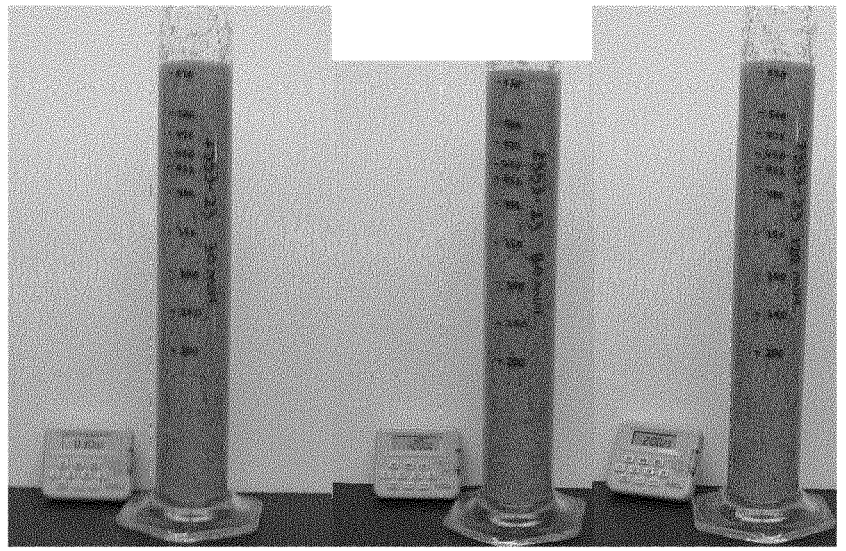
FIG. 10 shows photos of sand settling test in 14.2 ppg CaBr2 containing 6% EHS/Cosurfactant B.
Figure 10:
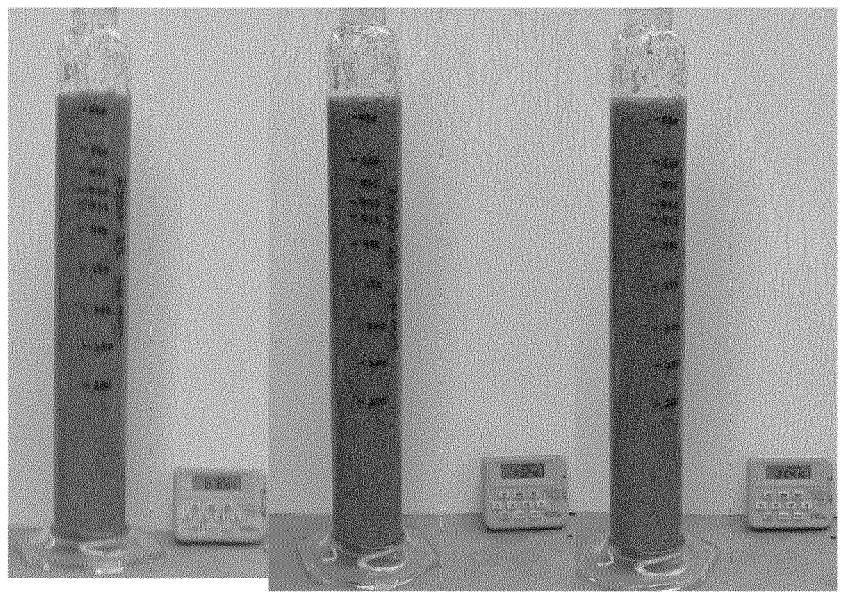

Many viscoelastic fluids need a long period of time to recover the viscosity after experiencing the high shear. Slow recovery can adversely affect the drag reduction and the capability of proppant transportation. FIGS. 8 and 9 show how long it took EHS/cosurfactant A system for viscosity recovery in 20% CaCl2 at 36° F. (100 $s^{-1}$ for FIG. 8 and 1 $s^{-1}$ for FIG. 9). Usually, the lower temperature, the longer recovery time needed. The results indicate that it only took the blend system 10-15 seconds to have viscosity climb up after changing the shear rate.

GENERAL PROCEDURES FOR SAND SETTLING TESTS (EXAMPLES 10-11)

Sand settling tests were done in 500 ml graduate cylinder. First, 550 ml of the test fluid was prepared using the same mixing procedures as Examples 1-7. Amount of sand (6 pound per gallon) and test fluid to make a total slurry volume of 550 ml were calculated and measured, and then the proppant was added into the bottle containing the test fluid. The whole mixture was shaken vigorously until the proppant was evenly dispersed. Once the slurry was prepared, it was poured into the 500 ml graduated cylinder. Volume of cleared liquid was recorded over a two hour period at room temperature. Then the cylinder was placed in the oven at 180° F. (82° C.) and preheated for 2 hours before the high temperature test began. It should be noted that several times of vigorous shake may be necessary during 2 hours of preheat.

Example 10

Table 1 summaries the results of sand settling test in 14.2 ppg CaBr2 containing 6% EHS/Cosurfactant B. At ambient temperature and 180° F., almost no sand settling was observed.

TABLE 1

6% 3:1 EHS/Ethoquad E/12-75 in 14.2ppg CaBr2

| Time (min) | RT | 180 F. |
|---|---|---|
|  | volume cleared (ml) | |
| 0 | 0 | 0 |
| 5 | 0 | 0 |
| 10 | 0 | 0 |
| 15 | 0 | 0 |
| 20 | 0 | 0 |
| 25 | 0 | 0 |
| 30 | 0 | 0 |
| 45 | 0 | 0 |
| 60 | 0 | 0 |
| 75 | 0 | 0 |
| 90 | 1 | 0 |
| 105 | 1 | <1 |
| 120 | 1 | <1 |

Example 11

Figure 11:
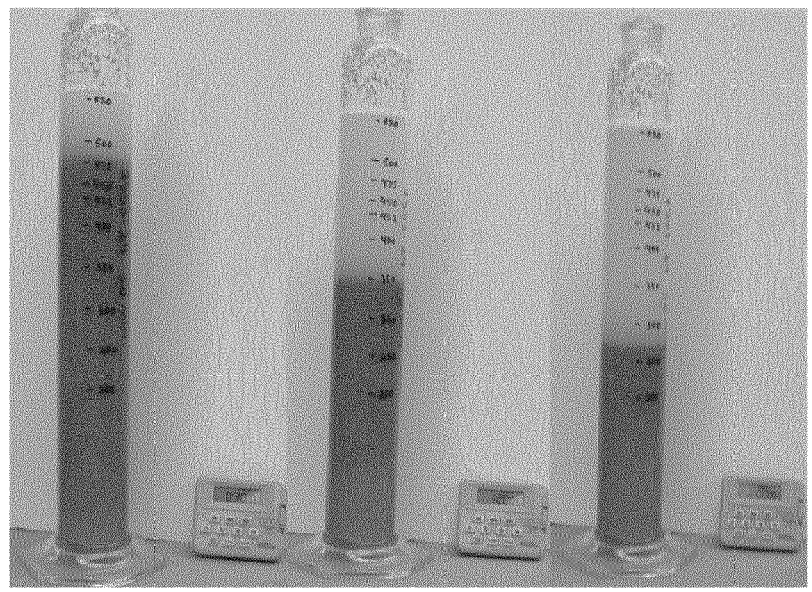
FIG. 11 shows photos of sand settling test in 15 ppg CaBr2 viscosified by 6% EHS/Cosurfactant B.
Figure 11:
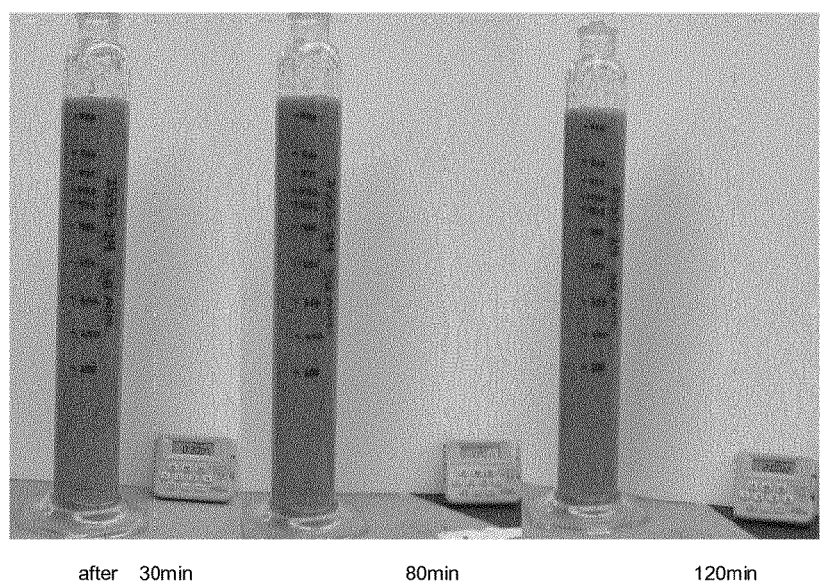

The sand settling test was also conducted in 15 ppg CaBr2 viscosified by 6% EHS/Cosurfactant B. Table 2 shows that almost no sand settled down at 180° F., but it did at room temperature. The total volume that was cleared out after 30 min was 79 ml, which was 14.4% of total volume. Shown in FIG. 11 are some photos of sand settling. Compared to Example 10, it has been found out that heavier brine has less capability to suspend the sand at low temperatures.

TABLE 2

6% 3:1 EHS/Ethoquad E/12-75 in 15ppg CaBr2

| Time (min) | RT volume cleared (ml) | 180 F. |
|---|---|---|
| 0 | 0 | 0 |
| 5 | 14 | 0 |
| 10 | 27 | 0 |
| 15 | 41 | 0 |
| 20 | 53 | 0 |
| 25 | 65 | 0 |
| 30 | 79 | 0 |
| 45 | 120 | 0 |
| 60 | 164 | 0 |
| 75 | 203 | 0 |
| 90 | 236 | <1 |
| 105 | 267 | <1 |
| 120 | 294 | 2 |

We claim:

1. A viscoelastic fluid comprising at least one viscoelastic surfactant and at least one synergistic co-surfactant, wherein said viscoelastic surfactant is an amphoteric surfactant of the general formula (I):

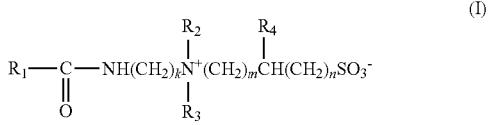

wherein R1 is a saturated or unsaturated, hydrocarbon group of from 17 to
29 carbon atoms, R2 and R3 are each independently selected from a straight chain or branched, alkyl or hydroxyalkyl group of from 1 to 6 carbon atoms, R4 is selected from H, a hydroxyl group, alkyl or hydroxyalkyl groups of from 1 to 4 carbon atoms; k is an integer of from 2-20, m is an integer of from 1-20, and n is an integer of from 0-20;
and said synergistic co-surfactant is of the general structure (II)

wherein R1 is a saturated or unsaturated, hydrocarbon group of from 12 to 22 carbon atoms, R2, R3 and R4 are each independently selected from a straight chain or branched, alkyl or hydroxyalkyl group of from 1 to 4 carbon atoms; and a hydroxyl group,
wherein the viscoelastic fluid has a density of greater than 1.2 kg/L.

2. The viscoelastic fluid of claim 1 wherein in general formula (I), R1 is a fatty aliphatic group derived from natural fats or oils having an iodine value of from about 1 to 140.

3. The viscoelastic fluid of claim 2 wherein in general formula (I), R1 is a fatty aliphatic group derived from natural fats or oils having an iodine value of from 30 to 90.

4. The viscoelastic fluid of claim 3 wherein in general formula (I), R1 is a fatty aliphatic group derived from natural fats or oils having an iodine value of from 40 to 70.

5. The viscoelastic fluid of claim 2 wherein in general formula (I), R1 is a fatty aliphatic group derived from natural fats, oils, or petroleum stocks of a single chain length or of mixed chain length, wherein said natural fats and oils or petroleum stocks are selected from tallow alkyl, hardened tallow alkyl, rapeseed alkyl, hardened rapeseed alkyl, tall oil alkyl, hardened tall oil alkyl, coco alkyl, oleyl, erucyl, soya alkyl and combinations thereof.

6. The viscoelastic fluid of claim 1 wherein in the viscoelastic surfactant of general Formula (I) R1 is an unsaturated alkyl group having 21 carbons, R2 and R3 are methyl group, R4 is hydroxyl group, k equals 3, both m and n are 1.

7. The viscoelastic fluid of claim 1 wherein the viscoelastic surfactant of general formula (I) is selected from erucamidopropyl hydroxypropyl sulfobetaine, erucamidopropyl hydroxyethyl sulfobetaine, erucamidopropyl hydroxymethyl sulfobetaine and combinations and mixtures thereof.

8. The viscoelastic fluid of claim 1 wherein in said co-surfactant of Formula (II) R1 is unsaturated 18 carbon chain alkyl group, and R2, R3 and R4 are methyl groups.

9. The viscoelastic fluid of claim 1 wherein in said co-surfactant of Formula (II) R1 is a unsaturated 22 carbon chain alkyl group, R2, and R3 are ethylhydroxy groups and R4 is a methyl group.

10. The viscoelastic fluid of claim 1 wherein said co-surfactant is selected from tallowtrimethylammonium chloride, erucyl amine (2) ethoxylate quaternary ammonium salt and mixture thereof.

11. The viscoelastic fluid of claim 1 wherein the concentration of viscoelastic surfactant in the viscoelastic fluid is from 0.5% to 10% by weight and the concentration of the co-surfactant in the viscoelastic fluid is from 0.1 wt % to 4% by weight.

12. The viscoelastic fluid of claim 1 wherein the concentration of viscoelastic surfactant in the viscoelastic fluid is from 2% to 8% by weight and the concentration of the co-surfactant in the viscoelastic fluid is from about 0.5 wt % to about 1.5 wt %.

13. The viscoelastic fluid of claim 12 wherein the concentration of viscoelastic surfactant in the viscoelastic fluid is from 3% to 5% by weight.

14. The viscoelastic fluid of claim 1 wherein the ratio of viscoelastic surfactant to synergistic co-surfactant is from 1:1 to 15:1.

15. A method of fracturing a subterranean formation comprising the steps of pumping the viscoelastic fluid of claim 1 through a wellbore and into a subterranean formation at a pressure sufficient to fracture the formation.

* * * * *